United States Patent [19]

Fritz et al.

[11] Patent Number: 4,570,789
[45] Date of Patent: Feb. 18, 1986

[54] BALE OF STRAW OR HAY

[75] Inventors: Ulrich Fritz, Erbach; Rony Kelz, Michelstadt, both of Fed. Rep. of Germany

[73] Assignee: Polygress Plastic GmbH, Michelstadt, Fed. Rep. of Germany

[21] Appl. No.: 603,213

[22] Filed: Apr. 23, 1984

[30] Foreign Application Priority Data

Apr. 22, 1983 [DE] Fed. Rep. of Germany ... 8311900[U]

[51] Int. Cl.$^4$ .............................................. B65D 71/00
[52] U.S. Cl. ..................................... 206/83.5; 206/410
[58] Field of Search ...................... 206/83.5, 410, 389, 206/417, 400, 398

[56] References Cited

U.S. PATENT DOCUMENTS

| 701,579 | 6/1902 | Kirshner | 206/83.5 |
| 983,492 | 2/1911 | Hairriss | 206/83.5 |
| 2,075,023 | 3/1937 | David | 206/83.5 |
| 2,184,286 | 12/1939 | Collins | 206/83.5 |
| 3,747,743 | 7/1973 | Hoffmann, Jr. | 206/83.5 |
| 4,248,343 | 2/1981 | Schaefer | 206/83.5 |

FOREIGN PATENT DOCUMENTS

| 517813 | 3/1953 | Belgium | 206/83.5 |
| 692761 | 4/1930 | France | 206/83.5 |
| 841643 | 5/1939 | France | 206/410 |

Primary Examiner—Joseph Man-Fu Moy
Attorney, Agent, or Firm—Michael J. Striker

[57] ABSTRACT

A rolled-up bale formed of straw, hay or the like is covered with a plastics netlike band which has an end portion partially overlapping the periphery of the bale and self-held on that periphery because the rough outer particles of the straw bale penetrate the mesh of the netlike band.

5 Claims, 2 Drawing Figures

BALE OF STRAW OR HAY

BACKGROUND OF THE INVENTION

The present invention relates to cylindrical bales which are rolled-up of at least one compressed layer of straw, hay or grass and utilized for feeding animals.

Cylindrical rolled bales have more and more often replaced widely utilized square bales in which straw or hay is compressed in harvester threshers or similar devices. In order to avoid loosening of the rolled bales the latter have been normally wound with strong binding yarn the ends of which have been tied up. Such a strengthening of the bale by means of a binding yarn has, however many disadvantages. During the winding of the binding yarn about the bale this yarn deeply cuts in the bale. For the following rolling out of the bale the latter should be first lowered, then for example ten or fifteen turns of the binding yarn should be cut and then removed from the bale. Under such circumstances the residues of the plastics, of which the binding yarn has been formed, often remain in the straw or hay of the bale. These residues of the binding yarn can hurt animals during the feeding of animals from automatic feeders because the animals would eat those residues. The bale material between the individual cut turns of the binding yarn becomes loose so that the bale can be pulled out by an animal.

Furthermore, the rolled bales tied-up with binding yarn do not look neat. During the picking-up and dumping such twined rolled bales for transporting or stacking the same the outer surfaces of the bales rub against each other and therefore partially wear off. The disadvantage of such bales is that the twining of the rolled bales with the binding yarn is relatively time-consuming and requires a lot of manual labor.

SUMMARY OF THE INVENTION

It is an object of the present invention to improve cylindrical rolled bales of straw or hay utilized for feeding animals.

It is another object of the present invention to provide a rolled bale of straw or hay, in which a binding yarn is not required and in which the outer surface is protected against fraying and an unfavorable influence of the atmosphere air on the outer surface of the bale is avoided.

These and other objects of the present invention are attained by a cylindrical bale rolled up of at least one pressed layer of straw, hay or grass and having an outer periphery, the bale being formed at least on said periphery of a netlike band, said band having an end portion which overlaps at least one third of said periphery and is self.

The netlike band may be constituted of a plurality of stretched-out foil plastics strips made of raschel fabric. This ratchel fabric has a relatively large mesh size. The net catches the rough outer side of the straw or hay bale over the entire periphery of the band including its end overlapping portion whereby a self-holding of the band wound about the rolled bale is ensured. Such a securing of the netlike band to the bale makes the use of the binding yarn or any other twining means entirely superfluous.

The mesh size of the net of the band can be so selected that it is practically impossible for animals, for example cows, sheeps or goats, or pull out plastics foil strips of the netlike band from straw or hay.

The utilization of one netlike band or a plurality of netlike bands ensures quick and effective rolling up of the bale comparable to a multilayer bale provided with the binding yarn. Thereby time required for securing bales to hold them in place can be saved and the material consumption can be also reduced due to the provision of the netlike bands. Thus the sufficient saving of materials and time appears to be obvious.

Netlike bands of stretched-out plastics foil strips of raschel fabric are extremely tear-resistant and also elastic. In order to use the bale a cut is made on the net by a knife and the band is no longer held on the bale so that there is no danger for an animal to eat the residues of the netlike band.

It is also advantageous that if a number of netlike bands on one bale or the outer surface of the bale can be only partially covered with a netlike band a marking can be made on the edge of the band to provide for a visual control of the location of the end portion of the band on the bale. It is expedient, for example to cover the edge of the end portion with a foil strip-like material which is darker than the remaining portion of the band. The edges of the end portion can be, for example covered with ink which would also serve as marking.

The novel features which are considered a characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
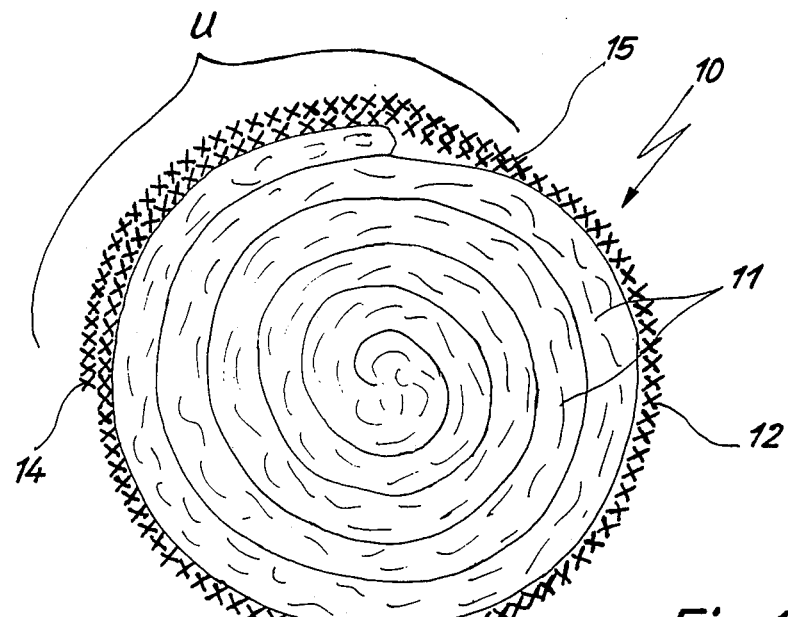
FIG. 1 is a top plan view of rolled bale according to the invention.
Figure 2:
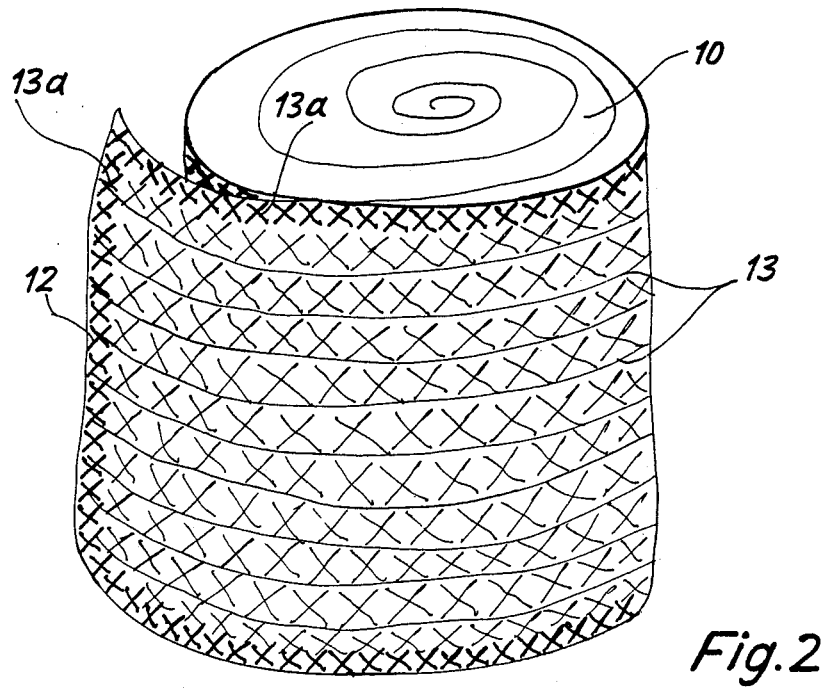
FIG. 2 is a side view of the rolled bale of FIG. 1.

FIG. 1 illustrates a cylindrical bale 10 formed of a plurality of individual wound-up layers 11 made out from, for example the straw of threshed corn reeds. The bale is covered over its periphery with a netlike band 12 which in the exemplified embodiment extends over the entire height or width of the bale 10. The length of the netlike band 12 is so selected that it has an end portion the length of which is at least one third the periphery of the bale. This end portion designated by U and is sufficiently long to overlap one third of the periphery or circumference of the rolled-up bale. The netlike band is constituted of stretched-out plastics foil strips 13 made of raschel fabric. The plastics material may be elastic or flexible low pressure polyethylene.

In order to control the location and a neat overlapping of the end portion of the netlike band 12 is this band provided at its end edges 14 and 15 and also at the both elongated rims with a clearly visible edge marking. In the preferred embodiment the rim of the raschel fabric is covered with a strip-like layer of ink drops. Strips of a textile material darker than the remaining portion of the netlike band can be utilized as marking. For example, foil ribbons can be used.

Since reed ends project outwardly from the outer periphery of the outermost layer 11 of the bale because these reed ends penetrate through the mesh or pores of the netlike band 12, will the whole netlike band including its overlapping portion U be securely held on the outer periphery of the bale so that specific fastening means for holding the rolled-up band 12 together in the bale are no longer required.

It will be understood that each of the elements described above, or two or more together, may also find a useful application in other types of bales of straw or hay differing from the types described above.

While the invention has been illustrated and described as embodied in a bale of straw or hay, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cylindrical bale rolled up of at least one pressed layer of straw, hay or grass and having an outer periphery, the bale being formed at least on said periphery of a netlike band, said netlike band being constituted of a plurality of stretched-out plastic strips made of raschel fabric and having an end portion which overlaps at least one third of said periphery and is selfheld thereon due to penetration of the material of the bale through a mesh of the band.

2. The bale as defined in claim 1, wherein said netlike band is constituted of a plurality of stretched-out plastics strips made of raschel fabric.

3. The bale as defined in claim 1, wherein said strips are formed of flexible low pressure polyethylene.

4. The bale as defined in claim 3, wherein said netlike band has an edge marking to provide a visual control of the location of said end portion.

5. The bale as defined in claim 4, wherein said marking is formed by a strip-like material extended over the edges of said end portion, said strip-like material being textile material darker than the remaining portion of the netlike band.

* * * * *